United States Patent
Hu et al.

(10) Patent No.: US 9,266,688 B2
(45) Date of Patent: Feb. 23, 2016

(54) FEED VESSELS AND SYSTEMS FOR PNEUMATICALLY CONVEYING SOLID PARTICLES

(75) Inventors: Lishun Hu, Shanghai (CN); Wei Chen, Shanghai (CN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 838 days.

(21) Appl. No.: 13/237,305

(22) Filed: Sep. 20, 2011

(65) Prior Publication Data

US 2012/0082517 A1    Apr. 5, 2012

(30) Foreign Application Priority Data

Sep. 30, 2010  (CN) .......................... 2010 1 0508025

(51) Int. Cl.
*B65G 53/40* (2006.01)
*B65G 53/16* (2006.01)

(52) U.S. Cl.
CPC ............. *B65G 53/16* (2013.01); *B65G 53/40* (2013.01)

(58) Field of Classification Search
CPC ............................. B01B 7/1472; B01J 8/0025
USPC .................................. 406/92, 136, 146, 153
See application file for complete search history.

(56) References Cited

U.S. PATENT DOCUMENTS

| | | | |
|---|---|---|---|
| 3,797,707 A | 3/1974 | Jenike et al. | |
| 4,286,883 A | 9/1981 | Johanson | |
| 4,441,822 A * | 4/1984 | Biswas et al. | 366/101 |
| 5,002,092 A | 3/1991 | Oirschot | |
| 5,423,133 A * | 6/1995 | Annen et al. | 34/585 |
| 5,522,555 A | 6/1996 | Poole | |
| 5,651,479 A | 7/1997 | Bates | |
| 6,220,791 B1 | 4/2001 | Hutchins | |
| 7,581,905 B2 | 9/2009 | Berggren | |
| 2007/0189935 A1* | 8/2007 | Yaluris et al. | 422/145 |
| 2008/0271657 A1* | 11/2008 | Cross | 110/347 |
| 2010/0034599 A1* | 2/2010 | Snowdon | 406/12 |
| 2011/0017786 A1 | 1/2011 | Hamel et al. | |

FOREIGN PATENT DOCUMENTS

| CN | 88106710.5 | 9/1988 |
|---|---|---|
| CN | 1032746 A | 5/1989 |

(Continued)

OTHER PUBLICATIONS

Unofficial English translation of CN Office Action dated Dec. 10, 2013 from corresponding Application No. 201010508025.4.

(Continued)

*Primary Examiner* — Joseph Dillon, Jr.
(74) *Attorney, Agent, or Firm* — GE Global Patent Operation; Peter T. DiMauro

(57) ABSTRACT

A feed vessel for pneumatically conveying solid particles includes a cylindrical portion, a first conical portion and a second conical portion. The first conical portion extends downward from the cylindrical portion and is configured to be in fluid communication with the cylindrical portion. The second conical portion extends downward from the first conical portion and is configured to be in fluid communication with the first conical portion. The second conical portion is configured to form a mass flow of solid particles therein and defines at least one outlet thereon for discharging the solid particles. A method for pneumatically conveying solid particles is also presented.

8 Claims, 3 Drawing Sheets

(56) References Cited

FOREIGN PATENT DOCUMENTS

| | | | |
|---|---|---|---|
| CN | 1705599 | A | 12/2005 |
| CN | 1715160 | A | 1/2006 |
| CN | 200510042918 | | 1/2006 |
| CN | 2808837 | Y | 8/2006 |
| CN | 200620079543.8 | | 8/2006 |
| CN | 1915774 | A | 2/2007 |
| CN | 2873692 | Y | 2/2007 |
| CN | 200940041 | Y | 8/2007 |
| CN | 200948983 | Y | 9/2007 |
| CN | 201023885 | Y | 2/2008 |
| DE | 102008014475 | A1 | 11/2009 |
| EP | 0348008 | A1 | 12/1989 |
| EP | 0626196 | B1 | 1/1999 |
| EP | 1162140 | A2 | 12/2001 |
| EP | 2165951 | A1 | 3/2010 |
| JP | 5361996 | U | 5/1978 |
| JP | 55106939 | A | 8/1980 |
| JP | 1053331 | A | 2/1998 |
| JP | 2004035235 | A | 2/2004 |
| JP | 2010143659 | A | 7/2010 |

OTHER PUBLICATIONS

Unofficial English Translation of Chinese Office Action issued in connection with corresponding CN Application No. 201010508025.4 on Jun. 12, 2014.

Unofficial English translation of Office Action issued in connection with corresponding JP Application No. 2011-213605 on Jul. 21, 2015.

* cited by examiner

FEED VESSELS AND SYSTEMS FOR PNEUMATICALLY CONVEYING SOLID PARTICLES

BACKGROUND

The disclosure generally relates to pneumatic conveyance technology, and more particularly to feed vessels and systems for pneumatically conveying solid particles.

Feed vessels and systems for pneumatically conveying solid particles indicates devices or systems for transporting the solid particles from one place to another by the aid of gas. The pneumatic conveyance technology has many applications, and is particularly widely used in the coal gasification industry. For a traditional gasification system, one example of the solid particles to be conveyed is coal powder. The gasification feed system generally comprises a feed vessel and an output pipeline connecting the feed vessel with a gasifier. The feed vessel introduces the solid particles and a carrier gas. The carrier gas carries the solid particles to flow through the feed vessel and the output pipeline and finally enter the gasifier for generating syngas by partially oxidizing the solid particles.

One problem faced by current feed vessels or feed systems is that the flow rate of the solid particles (referred to as "solid flow rate") is unstable in the feed vessel and/or the output pipeline. The unstable situation may be worse if the feed vessel is operated under a high pressure. The unstable solid flow rate tends to generate unexpected temperature fluctuation in the gasifier, which shortens the lifetime of gasifier and damages gasification performance.

Currently, there are various attempts at solving this problem. One prior way is adding a gas from the bottom of the feed vessels to fluidize the solid particles. Another way is to add inner construction to regulate the solid particles flow. However, these ways make some improvements to the stability, but have yet to satisfy the practical applications. Therefore, there is a need to provide improved feed vessels or feed systems that satisfy practical applications on the conveyance stability of the solid particles.

BRIEF DESCRIPTION

In accordance with one embodiment, a feed vessel for pneumatically conveying solid particles comprises a cylindrical portion, a first conical portion and a second conical portion. The first conical portion extends downward from the cylindrical portion and is configured to be in fluid communication with the cylindrical portion. The second conical portion extends downward from the first conical portion and is configured to be in fluid communication with the first conical portion. The second conical portion is configured to form a mass flow of solid particles therein and defines at least one outlet thereon for discharging the solid particles.

In accordance with another embodiment, a feed system for pneumatically conveying solid particles comprises a feed vessel and an output pipeline. The feed vessel comprises a cylindrical portion; a first conical portion extending downward from the cylindrical portion and configured to be in fluid communication with the cylindrical portion; and a second conical portion extending downward from the first conical portion and configured to be in fluid communication with the first conical portion; wherein the second conical is configured to form a mass flow of the solid particles. The output pipeline is configured to extend into the second conical portion for discharging the solid particles.

In accordance with another embodiment, a method for pneumatically conveying solid particles comprises providing a feed vessel that comprises a cylindrical portion, a first conical portion extending downward from the cylindrical portion and a second conical portion extending downward from the first conical portion; introducing the solid particles and a carrier gas into the cylindrical portion to form a solid-gas mixture; forming a mass flow of the solid particles in the second conical portion; and discharging the solid-gas mixture from the second conical portion.

These and other advantages and features will be further understood from the following detailed description of the invention that is provided in connection with the accompanying drawings.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

The disclosure relates to feed vessels and feed systems for pneumatically conveying solid particles from one place to another. The solid particles include but are not limited to solid fuel particles, cement and carbon soot. The solid fuel particles include but are not limited to coal powder and biomass.

Figure 1:
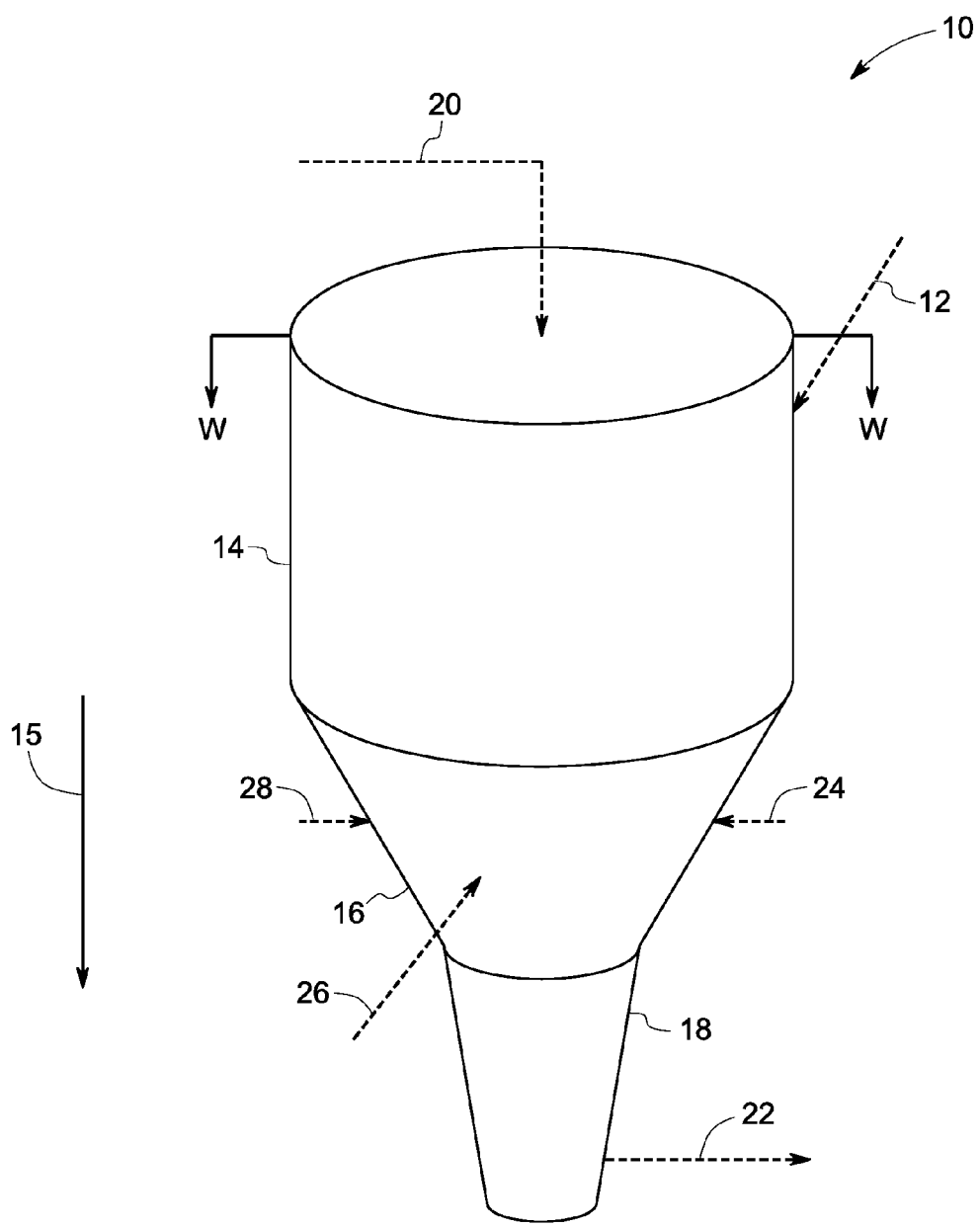
FIG. 1 is a perspective view of a feed vessel in accordance with one embodiment.
Figure 2:
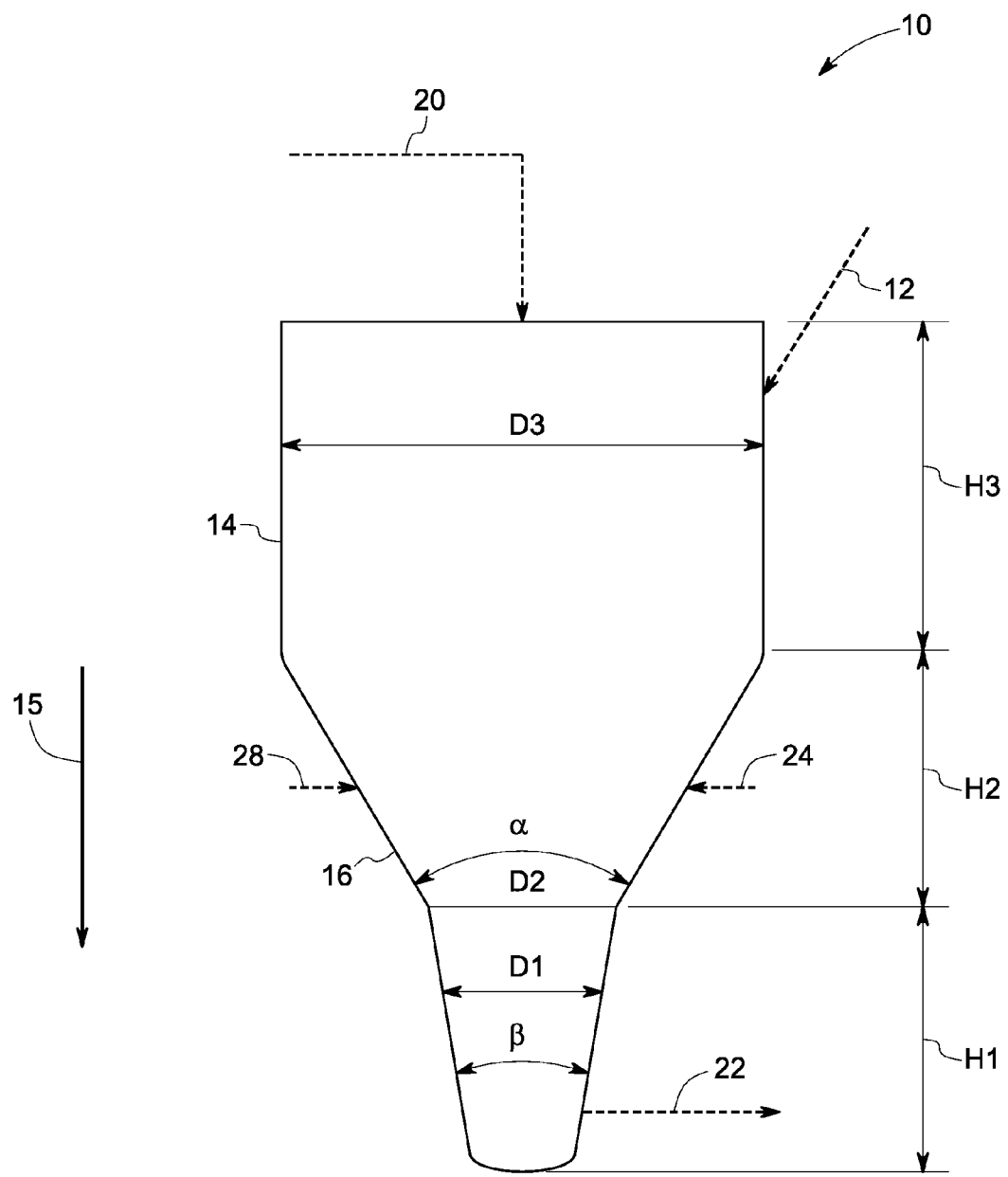
FIG. 2 is a sectional view of the feed vessel shown in FIG. 1 taken along a line W-W.

FIG. 1 illustrates a feed vessel 10 for pneumatically conveying solid particles 12 in accordance with one embodiment. FIG. 2 shows a sectional view of the feed vessel 10 in FIG. 1. The feed vessel 10 comprises a cylindrical portion 14, a first conical portion 16 and a second conical portion 18 all of which are in fluid communication with each other. The first conical portion 16 connects the cylindrical portion 14 with the second conical portion 18 along a solid particles flow direction 15. Although the first conical portion 16 and the second conical portion 18 have round cross sections in the example shown in FIG. 1, aspects of the invention do not exclude other cross-sectional shapes such as a rectangle. In one embodiment, the cylindrical portion 14, the first conical portion 16 and the second conical portion 18 are substantially concentric with each other along the solid particles flow direction 15.

Referring to FIGS. 1 and 2, the cylindrical portion 14 in one embodiment comprises a plurality of inlets (not shown) for introducing and mixing the solid particles 12 and a carrier gas 20 to form a solid-gas mixture 22. The first conical portion 16 in one embodiment is configured to form a funnel flow of the solid particles and the second conical portion 18 is configured to form a mass flow of the solid particles. As used herein, the term "funnel flow" indicates the solid particles in a center area of an element are in motion, while the solid particles adjacent to periphery walls of the element are stationary. As used herein, the term "mass flow" indicates substantially all solid particles are in motion.

As FIG. 2 shows, the first conical portion 16 has a cone angle, noted as angle Alfa ($\alpha$). The second conical portion 18 has a cone angle, noted as angle Beta ($\beta$). The angle Alfa is configured to be greater than the angle Beta. In one embodiment, the first conical portion forms a funnel flow by setting the angle Beta greater than an included angle of the feed vessel 10, and the second conical portion 18 forms a mass flow by setting the angle Alfa less than the included angle. It is understood that aspects of the invention do not exclude using other ways to form the funnel flow and/or the mass flow.

There are many factors impacting the size of the included angle, such as the average size of the solid particles 12, the moisture content, the material of the feed vessel 10, the friction between the solid particles 12 and the feed vessel 10. In one embodiment, a commercial test machine is employed to determine the included angle. The input data comprises particles properties including the average diameter of the conveyed solid particles, and wall properties including the wall friction angle and internal friction angle. The commercial test machine calculates the included angle based on these input data. In one embodiment, the included angle is about 40 degrees, noted as 40°.

In one embodiment, the angle Alfa is in a range from about 1.2 to about 4 times the angle Beta. In another embodiment, the angle Alfa is configured to be in a range from about 60° to about 70° and the Beta is configured to be in a range from about 30° to about 40°. In one example of the feed vessel 10, the whole height (H1+H2+H3) of the feed vessel 10 is in a range from about 1 to about 5 times the diameter (D3) of the cylindrical portion 14. The proportion of height (H2) to middle diameter (D2) of the first conical portion 16 according to one example is in a range from about 0.5 to about 2. The proportion of height (H1) to middle diameter (D1) of the second conical portion 18 according to one example is in a range from about 3 to about 15.

Referring again to FIGS. 1 and 2, the feed vessel 10 further comprises at least one outlet (not shown) that is defined on the second conical portion 18. During conveyance, the carrier gas 20 carries the solid particles 12 to start from the cylindrical portion 14 and enter the second conical portion 18 after passing the first conical portion 16. Finally, the solid-gas mixture 22 is discharged from the outlet. With such configuration and discharging mode, the solid flow rate is prone to be stable and controllable since all solid particles are in motion and have a stable flow in the second conical portion 18. The configuration makes it is easier to manufacture.

As above depicted, the second conical portion 18 is configured to form mass flow, which causes its cone angle (Alfa) to be smaller compared with the situation where a funnel flow is formed. The first conical portion 16 with a funnel flow is arranged between the conical portion 14 and the second conical portion 18, which decreases the whole height of the feed vessel 10.

In order to avoid these solid particles from being stationary in the first conical portion 16, in one embodiment, at least one fluidizing gas is introduced to loosen the stationary solid particles 12 adjacent to an inner surface of the periphery wall of the first conical portion 16. The term "loosen" as used herein indicates fluidizing a portion of the solid particles 12 and has no impact on the solid particles 12 in a central area of the first conical portion 16.

In one example, the first conical portion 16 has a plurality of inlets (not shown) around outer surface thereof for introducing a plurality of fluidizing gas streams 24, 26 and 28, as shown in FIG. 1. The amount of the inlets and the distances among the inlets are adjusted based on the size of the first conical portion 16. The introducing direction of the fluidizing gas steam 24, 26 and 28 in one example are set to be perpendicular to the flow direction 15. In another embodiment, the introducing direction is set to be perpendicular to the outer surface of the first conical portion 16.

In one example, a fluidizing gas distributor is employed and affixed to the inner wall of the first conical portion 16. The fluidizing gas distributor defines a plurality of holes for dividing one fluidizing gas into multiple streams so as to more equally loosen the solid particles 12.

Figure 3:
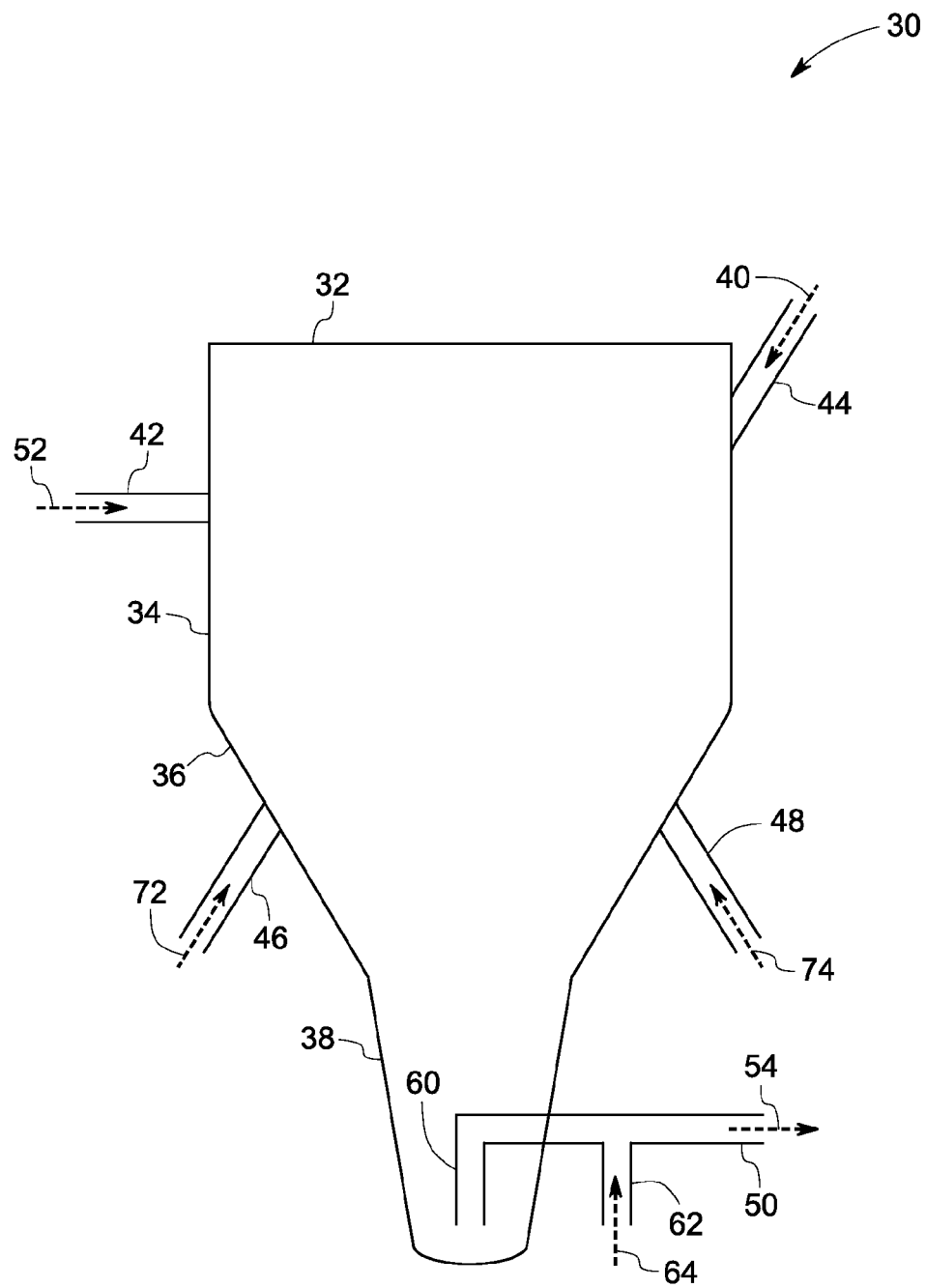
FIG. 3 is a sectional view of a feed system in accordance with another embodiment.

FIG. 3 illustrates a feed system 30 for pneumatically conveying solid particles 40 in accordance with another embodiment. The feed system 30 comprises a feed vessel 32 and a plurality of pipelines coupled to the feed vessel 32. It is understood that the feed vessel 32 may be configured to be any of the above-mentioned embodiments.

In the example shown in FIG. 3, the feed vessel 32 has a cylindrical portion 34, a first conical portion 36 extending downward from the cylindrical portion 34 and a second conical portion 38 extending downward from the first conical portion 36. The first conical portion 36 is configured to form a funnel flow of the solid particles 40 and the second conical portion 38 is configured to form a mass flow of the solid particles 40.

In one example, the pipeline comprises a carrier gas pipeline 42, a solid pipeline 44, a plurality of fluidizing gas pipelines 46 and 48 and at least one output pipeline 50. The carrier gas pipeline 42 and the solid pipeline 44 are coupled to the cylindrical portion 46 for introducing and mixing a carrier gas 52 and solid particles 40 to form a solid-gas mixture 54. The fluidizing gas pipelines 46 and 48 are coupled to the first conical portion 36 for introducing multiple fluidizing gas streams 56 and 58 to loosen the solid particles 40 adjacent to an inner wall of the first conical portion 36.

The at least output pipeline 50 is coupled to the second conical portion 38 with the mass flow for conveying the solid-gas mixture 54 from the feed vessel 32 to another place. With such configuration, the stable solid flow rate is obtained since all solid particles 40 in the second conical portion 38 are in motion and even may have similar velocities. In one embodiment, the at least output pipeline 50 has an upward portion 60 extending into the second conical portion 38. The upward portion 60 is located adjacent to a central axis (not labeled) of the second conical portion 38. The flow direction of solid particles in the upward portion is opposite to the gravity direction, which regulates all solid particles with different size to have consistent movement and further ensures the solid flow rate controllable.

The feed system 30 in one example further has at least one supplemental gas pipeline 62 coupled to the output pipeline 50. The supplemental gas pipeline 62 introduces at least one supplemental gas stream 64 to regulate the solid flow rate by changing the gas volume in the output pipeline 50.

The solid particles 40 are discharged from the second conical portion 38, which ensures the solid particles flow stable and controllable. The fluidizing gas streams 56 and 58 are employed, which enables all particles in motion in funnel flow area, thereby improving fluidity of the solid particles. Although the solid particles are stably discharged, it is also significant during the conveyance between the feed vessel and a targeting container. The supplemental gas stream 64 is employed at downstream of the feed vessel 32 so as to ensure the stable conveyance in downstream positions.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A feed vessel for pneumatically conveying solid particles, comprising:

a cylindrical portion, the cylindrical portion comprising at least one carrier gas inlet for introducing a carrier gas and further comprising at least one solids inlet for introducing solid particles;

a first conical portion, having a first cone angle, and extending downward from the cylindrical portion and configured to be in fluid communication with the cylindrical portion, wherein the first conical portion comprises a plurality of inlets for introducing fluidizing gas; and a second conical portion, having a second cone angle, and extending downward from the first conical portion and configured to be in fluid communication with the first conical portion;

wherein a ratio of cone angles of the first and second conical portions is in a range from about 1.2 to about 4; and wherein the second conical portion defines at least one outlet thereon for discharging the solid particles.

2. The feed vessel of claim 1, wherein the fluidizing gas is configured to loosen the solid particles adjacent to an inner wall of the first conical portion.

3. The feed vessel of claim 1, wherein the first conical portion has a cone angle configured to be in a range from about 60 degrees to about 70 degrees.

4. The feed vessel of claim 1, wherein the second conical portion has a cone angle configured to be in a range from about 30 degrees to about 40 degrees.

5. The feed vessel of claim 1, wherein the first conical portion is configured to form a funnel flow of the solid particles.

6. A feed system for pneumatically conveying solid particles, comprising:

a feed vessel comprising:

a cylindrical portion, the cylindrical portion comprising at least one carrier gas inlet for introducing a carrier gas and further comprising at least one solids inlet for introducing solid particles;

a first conical portion extending downward from the cylindrical portion and configured to be in fluid communication with the cylindrical portion, wherein the first conical portion comprises a plurality of inlets for introducing fluidizing gas; and a second conical portion extending downward from the first conical portion and configured to be in fluid communication with the first conical portion; wherein the second conical portion is configured to form a mass flow of the solid particles; and an output pipeline configured to extend into the second conical portion for discharging the solid particles, further comprising a supplemental gas pipeline coupled to the output pipeline and configured to introduce a supplemental gas into the output pipeline.

7. The feed system of claim 6, wherein the output pipeline comprises an upward section where the solid particles flow towards the first conical portion.

8. The feed system of claim 6, wherein the second conical portion has a cone angle configured to be in a range from about 30 degrees to about 40 degrees.

* * * * *